United States Patent [19]
Toogood

[11] Patent Number: 4,848,019
[45] Date of Patent: Jul. 18, 1989

[54] AUTOMATIC WORM HOOKER

[76] Inventor: Paul Toogood, 1313 Sanborn Rd., Yuba City, Calif. 95991

[21] Appl. No.: 283,395

[22] Filed: Dec. 12, 1988

[51] Int. Cl.$^4$ .................................... A01K 97/00
[52] U.S. Cl. ............................................ 43/4
[58] Field of Search ................................ 43/4

[56] References Cited

U.S. PATENT DOCUMENTS

| | | | |
|---|---|---|---|
| 2,948,979 | 8/1960 | Kulp | 43/4 |
| 4,118,881 | 10/1978 | McFarlane | 43/4 |
| 4,559,734 | 12/1985 | Sauer | 43/4 |
| 4,706,403 | 11/1987 | Reynolds | 43/4 |

OTHER PUBLICATIONS

"Kalin's Worm Treader", a full—size photocopy of which is attached, with instructions therefor.

Primary Examiner—Gene P. Crosby
Attorney, Agent, or Firm—Townsend and Townsend

[57] ABSTRACT

An automatic worm hooker (2) for rapidly and safely embedding a fishing hook (10) completely within the body of a worm (8) includes an impaling member (20) whereon the worm (8) is impaled along the length of the worm, an extending member (18) which supports the impaling member (20), and a hand gripping member (16) attached to the extending member (18) for conveniently holding the apparatus (2) and tensioning the fishing line (12) attached to the hook (10). The impaling member (20) has a free end (44) that is tapered and concave. Once the worm (8) is impaled along the length of the impaling member (20), the point (50) of the hook (10) is inserted in the concave portion (72) of the free end (44) of the impaling member (20). The hook (10) and fishing line (12) are placed in tension by the user's hand. The worm (8) is then slid off of the impaling member (20) and onto the hook (10) with the result that the hook (10) is completely embedded in the body of the worm (8). A worm (8) so impaled does not readily come off of the fishing hook (10).

22 Claims, 2 Drawing Sheets

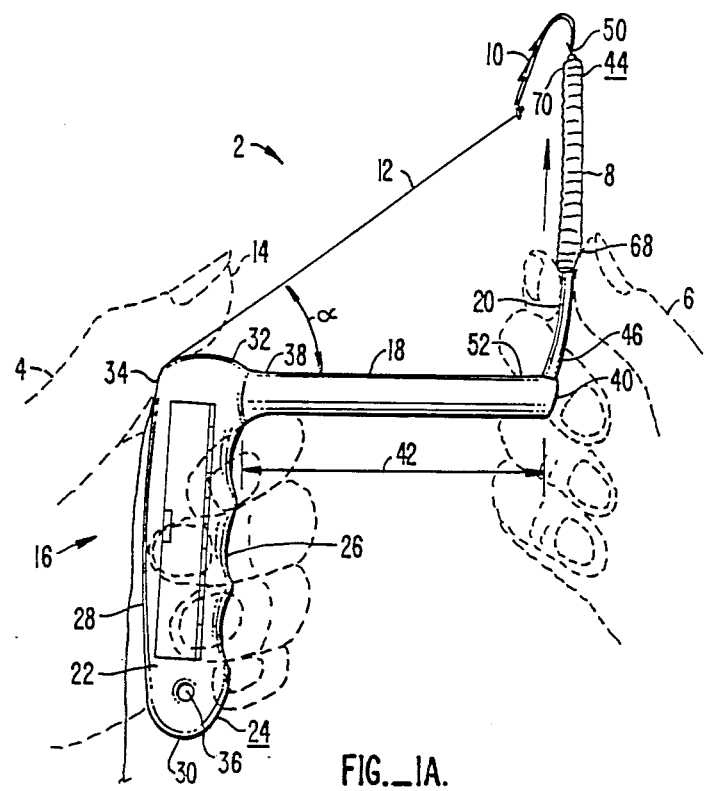
FIG._1A.
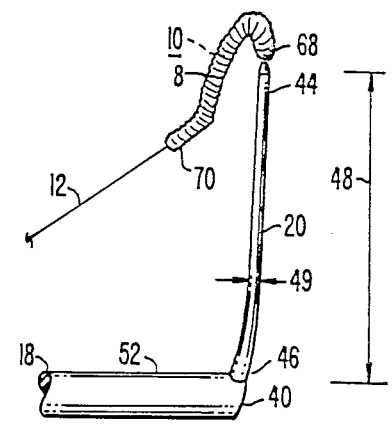
FIG._1B.
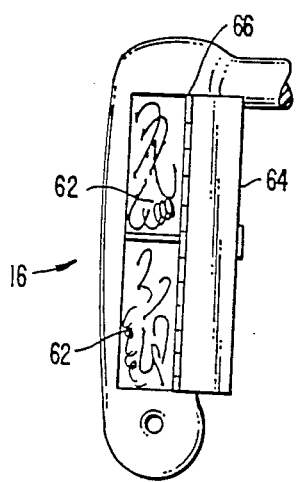
FIG._2.
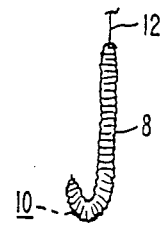
FIG._1C.

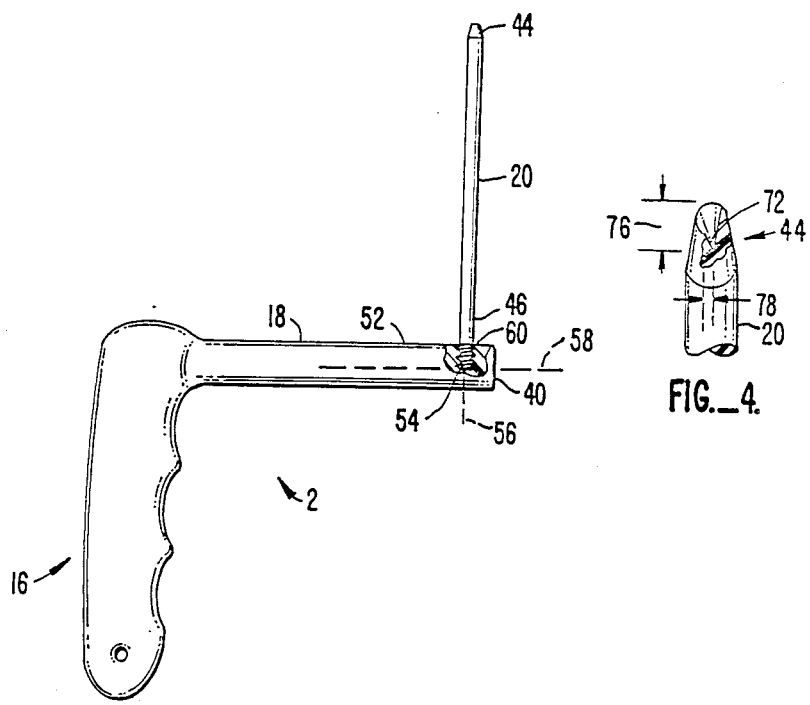
FIG._3.
FIG._4.
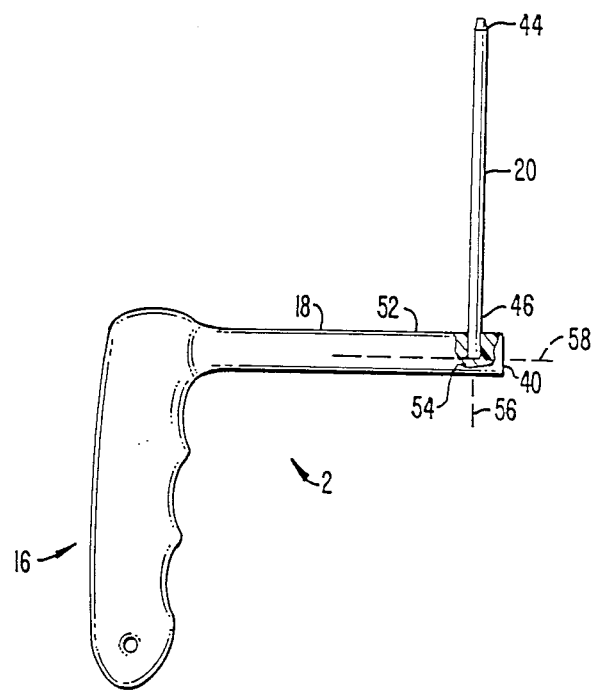
FIG._5.

AUTOMATIC WORM HOOKER

BACKGROUND OF THE INVENTION

This invention relates generally to devices for helping anglers put a worm on a fishing hook for use as bait.

Baiting a fishing hook with a live worm is a messy and somewhat troublesome procedure. Not only is it difficult to bait the worm, but frequently the worm is so inartfully impaled on the hook that the worm falls off while casting or after being in the water a very short time. Many anglers, especially children, find baiting a hook with a live worm especially difficult, and frequently turn to other bait, if not other pastimes.

SUMMARY OF THE INVENTION

The present invention is an automatic worm hooker that enables even an inexperienced angler to quickly and artfully bait a hook with a live worm. The present invention includes an impaling member with a concave or hollow opening at one, preferably tapered, end. The other end of the impaling member is attached to an extending member which in turn is attached to a hand gripping member, the extending member positioned transversely to the impaling and hand gripping member.

The angler holds the hand gripping member in one hand, pistol-like, and impales the worm lengthwise with the impaling member. The worm is completely impaled such that the concave end of the impaling member passes through a first end of the worm, through the entire length of the worm and exits through the second end of the worm.

The point of a hook to which a fishing line is attached is then inserted in the concave tip of the impaling member. The angler exerts tension on the line with his thumb such that the hook point is temporarily captured by the concave end of the impaling member. While maintaining the tension, the angler slides the worm off the impaling member and directly onto the point and body of the hook.

Because the point is substantially coaxial with the impaling member, and therefore with the worm, the worm readily slides onto and completely over the hook and, if desired, partially onto the fishing line. The hook is completely embedded within the body of the worm such that the worm will not readily fall off while casting or fishing. As a result, one worm may be used repeatedly while fishing, at least until a fish is caught.

The present invention advantageously provides an automatic worm hooker that enables a angler to rapidly and safely bait a worm on a fishing hook such that the hook is completely embedded within the worm, thereby assuring that the worm will not readily fall off or escape from the hook.

Other aspects, features and advantages of the invention will appear from the following description wherein the preferred embodiment has been set forth in detail in conjunction with the accompanying drawings.

BRIEF DESCRIPTION OF THE DRAWINGS

FIG. 1A is a side view of an automatic worm hooker according to the present invention during use.

FIG. 1B shows a worm being slid from the impaling member onto a fishing hook.

FIG. 1C shows the fishing hook completely embedded within the body of the worm.

FIG. 2 shows the hand gripping member of FIG. 1a, with the compartment door in an open position.

FIG. 3 is a side view of an automatic worm hooker according to the present invention, showing in cutaway view an alternative method of attaching the impaling member.

FIG. 4 is a perspective view of the concave tip of the impaling member.

FIG. 5 is a side view of an automatic worm hooker according to the present invention, showing in cutaway view a second alternative method of attaching the impaling member.

DETAILED DESCRIPTION OF THE PREFERRED EMBODIMENTS

FIG. 1A shows the present invention 2 held in a user's left hand 4 while a user's right hand 6 slides a worm 8 upward onto a fishing hook 10. Hook 10 is attached to a fishing line 12 which is placed in tension by the user's left thumb 14.

The automatic worm hooker 2 includes a hand gripping member 16, an extending member 18 and an impaling member 20. Hand gripping member 16 is integrally attached to the extending member 18 which is integrally attached to the impaling member 20.

The hand gripping member 16 includes a right side 22, a left side 24, a finger contacting side 26, and a palm contacting side 28. Hand gripping member 16 also includes a bottom 30, and a top 32 defining a line tensioning surface 34 against which surface 34 the user's thumb 14 exerts a tension on the fishing line 12. As shown in FIG. 1A, finger contacting side 26 may be scalloped to more comfortably accommodate a user's fingers. Bottom 30 may include a hole 36 to facilitate mounting the hooker 2 on a string to the user's belt.

The extending member 18 includes a first end 38, a second end 40, and a length 42 therebetween. First end 38 of extending member 18 is attached to the top 32 of the hand gripping member 16 adjacent the finger contacting side 26, substantially at a right angle to member 16.

The impaling member 20 includes a first end 44 and a second end 46, a length 48 therebetween and has a transverse dimension 49. As shown in FIG. 4, first end 44 is concave and is sized for receipt of the point 50 of the hook 10, as described below. Alternatively, first end 44 may be hollow. First end 44 may be tapered as shown in FIGS. 3 and 4, to facilitate piercing and impaling worm 8. Second end 46 of impaling member 20 is attached to the upper surface 52 of the second end 40 of extending member 18. As shown in FIG. 1, impaling member 20 is attached substantially at a right angle to member 18, substantially parallel to hand gripping member 16. Hand gripping member 16 and extending member 18 together form an L-shaped structure, which together with the impaling member 20 create a generally Z-shaped hooker 2.

FIG. 3 shows an alternative embodiment wherein impaling member 20 is removably attached to the second end 40 of the extending member 18. In this embodiment, upper surface 52 of extending member 18 includes a threaded hole 54 having a hole axis 56 substantially perpendicular to the longitudinal axis 58 of the extending member 18. Second end 46 of impaling member 20 includes threads 60 which threadably engage hole 54. Alternatively, as shown in FIG. 5 the threads in hole 54 and on second end 46 of impaling member 20 may be eliminated, such that lower end 46 is maintained within hole 54 by friction alone.

FIG. 1A and FIG. 2 show an embodiment wherein the hand gripping member 16 optionally includes one or more compartments 62, accessible by opening a compartment door 64 attached by a hinge 66 to the hand gripping member 16. According to this embodiment, hand gripping member 16 is substantially hollow, and compartment 62 is provided for the storage of items such as fish hooks 10, or replacement impaling members 20 for the embodiment shown in FIG. 3.

In use, the angler holds hooker 2 in one hand, grasping the hand gripping member 16 as shown in FIG. 1A. A first end 68 of a worm 8 is impaled upon the tapered first end 44 of impaling member 20. The worm 8 is then slid axially down the length of impaling member 20. The impaling motion is continued until the tapered first end 44 emerges slightly from the second end 70 of the worm 8. This positioning is substantially what is shown in FIG. 1A.

The angler then places the point 50 of a hook 10 into the concave opening 72 in the first end 44 of the impaling member 20. The angler then draws the fishing line 12 attached to the hook 10 toward the line tensioning surface 34 of the hand gripping member 16. The user's thumb 14 then presses line 12 against the line tensioning surface 34, exerting tension on line 12. This tension keeps point 50 in place.

As shown in FIG. 1B, the worm 8 is then slid axially upwardly off the impaling member 20 and onto the hook 10. Hook 10 is then removed from the impaling member 20. As indicated by FIG. 1C, hook 10 is completely embedded within the body of worm 8, with only line 12 emerging therefrom. Of course the amount of hook 10 covered by worm 8 will depend upon their relative sizes, and the action the angler may desire. As a result, worm 8 is securely attached to the hook 10 and will not readily fall or be shaken off.

The hand gripping member 16 is sized to accommodate a typical hand and may be about 4" (10 cm) in length as measured from the top 32 to the bottom 30. While the length 42 of extending member 18 is not critical, the angle α shown in FIG. 1A should be such that a user's thumb 14 can readily tension fishing line 12. In practice, an angle α ranging from about 20° to about 50°, and preferably about 40° appears suitable. Accordingly, the length 42 of the extending member 18 may be about 3" (7.5 cm). The length 48 of the impaling member 20 should be long enough to accommodate the body length of a worm 8, and may be about 3" (7.5 cm). The transverse dimension 49 of the impaling member 20 should be small enough to permit impaling worm 8. In the preferred embodiment, impaling member 20 has a transverse dimension 49 of approximately 0.1" (2.5 mm). The depth 76 of the hollow or concave opening 72 of first end 44 should be deep enough to hold the point 50 of hook 10. Depth 76 is preferably at least about 0.38" to about 0.5" (9 mm–12 mm). The inner transverse dimension 78 of first end 44 is sized to hold the point 80 of a hook 10 and may be about 0.06" (1.5 mm). If desired, the impaling member 20 may be made hollow throughout, eliminating the need for a concave opening 72 in the first end 44.

The present invention may be constructed out of almost any material. In the preferred embodiment shown in FIG. 1A, the entire hooker 2 is integrally molded from plastic. As noted, the impaling member 20 may be threadably, or otherwise, detachable from the extending member 18. The embodiment shown in FIG. 3 permits, transporting the present invention compactly, or readily replacing impaling member 20 in the event it breaks or is otherwise damaged. It is obvious to those skilled in the art that the embodiment shown in FIG. 3 could include a number of holes 54, threaded or otherwise, situated along the upper surface 52 of the extending member 18. In the event the impaling member 20 is damaged or breaks off at the second end 46, a replacement member 20 could be inserted in one of the additional holes 54.

Modifications and variations may be made to the disclosed embodiment without departing from the scope of the invention as defined by the following claims.

What is claimed is:

1. An apparatus for embedding a fishing hook having a point within the worm, the hook having a fishing line attached, the apparatus comprising:

an impaling member having a first concave end, a second end and a length therebetween, the impaling member sized to impale a worm thereon;

an extending member having a first end, a second end, and a length therebetween defining a longitudinal axis;

the second end of the impaling member being attached to the second end of the extending member substantially perpendicular to the longitudinal axis of the extending member; and a hand gripping member, attached to the first end of the extending member, for holding the apparatus by a user, the hand gripping member including a tension surface against which the fishing line can be biased by the user to maintain the fishing line in a state of tension while embedding the hook in the worm;

whereby the worm is impaled axially on the impaling member until the first end of the impaling member emerges from the worm, the point of the hook and then being placed in the first end of the impaling member while the line attached to the hook is held against the holding member by a user's thumb, thereby tensioning the line, the worm then being slid axially off the impaling member and onto the hook such that the hook is substantially embedded within the worm.

2. The invention of claim 1, wherein the first end of the impaling member is tapered.

3. The invention of claim 1, wherein the length of the impaling member and the length of the extending member and the position of the tension surface are chosen so the line attached to the hook forms an angle with respect to the extending member, while under tension, of about 20° to about 50°.

4. The invention of claim 3, wherein said angle is about 40°.

5. The invention of claim 1, wherein the hand gripping member and the extending member are integral.

6. The invention of claim 1, wherein the hand gripping member, the extending member and the impaling member are integral.

7. The invention of claim 1, wherein an upper surface of the second end of the extending member defines a hole having an axis substantially perpendicular to the longitudinal axis of the extending member, the hole sized to frictionally retain the second end of the impaling member.

8. The invention of claim 1, wherein an upper surface of the second end of the extending member defines a hole having an axis substantially perpendicular to the longitudinal axis of the extending member, said hole and the second end of the impaling member including threads for threadably attaching the impaling member to the extending member.

9. The invention of claim 1, wherein the hand gripping member is hollow and defines a storage compartment.

10. The invention of claim 9, further including a compartment door, sized to cover an opening of the compartment, and means for hinging the compartment door to the hand gripping member.

11. The invention of claim 1 wherein the impaling member has a transverse dimension of about 0.1" (2.5 mm).

12. The invention of claim 1 wherein the impaling member has a concave depth of at least about 0.38" (9 mm).

13. An apparatus for embedding a fishing hook having a point within the worm, the hook having a fishing line attached, the apparatus comprising:

an impaling member having a first tapered concave end, a second end, and a length therebetween, the impaling member sized to impale a worm thereon;

an extending member having a first end, a second end, and a length therebetween defining a longitudinal axis;

the second end of the impaling member being attached to the second end of the extending member substantially perpendicular to the longitudinal axis of the extending member; and a hand gripping member, integrally attached to the first end of the extending member, for holding the apparatus by a user, the hand gripping member including a tension surface against which the fishing line can be biased by the user to maintain the fishing line in a state of tension while embedding the hook in the worm, the length of the impaling member and the length of the extending member and the position of the tension surface being chosen so the line attached to the hook forms an angle with respect to the extending member, while under tension, of about 20° to about 50°;

whereby the worm is impaled axially on the impaling member until the first end of the impaling member emerges from the worm, the point of the hook then being placed in the first end of the impaling member while the line attached to the hook is held against the holding member by a user's thumb, thereby tensioning the line, the worm then being slid axially off the impaling member and onto the hook such that the hook is substantially embedded within the worm.

14. The invention of claim 13, wherein the impaling member and the extending member are integral.

15. The invention of claim 13, wherein the hand gripping member is hollow and defines a storage compartment.

16. The invention of claim 15, further including a compartment door, sized to cover an opening of the compartment, and means for hinging the compartment door to the hand gripping member.

17. The invention of claim 13 wherein the impaling member has a transverse dimension of about 0.1" (2.5 mm).

18. The invention of claim 13 wherein the impaling member has a concave depth of at least about 0.38" (9 mm).

19. A method for embedding a fishing hook substantially within a worm, the hook having a point and a fishing line attached, comprising the following steps:

selecting an impaling member having a length at least equal to a length of the worm, having a transverse dimension substantially small to penetrate the worm axially along the length of the worm, and having a first end defining a concavity, and a second end;

selecting an L-shaped handle having a first leg and a second leg joined together at an intersection region, with a fishing line engaging surface at the intersection region;

supporting the second end of the impaling member from a distal end of a first leg of the L-shaped handle so that the impaling member and L-shaped handle form a generally Z-shaped structure;

holding the Z-shaped structure by the second leg of the L-shaped handle such that the first end of the impaling member is free;

impaling the worm axially lengthwise on the impaling member by piercing a first end of the worm with the first end of the impaling member, and then sliding the length of the worm onto the impaling member;

placing the point of the hook in said concavity of the first end of the impaling member;

placing the fishing line in a state of tension with the fishing line captured between the fishing line engaging surface and a user's thumb, thereby retaining the point of the hook in place against the first end of the impaling member; and sliding the worm axially off the impaling member and onto the hook, thereby embedding the hook substantially within the body of the worm.

20. The method of claim 19, wherein said step of selecting an impaling member includes selecting an impaling member whose said first end is tapered.

21. The method of claim 19 further comprising the step of sizing the first leg of the L-shaped handle so the fishing line between the hook and the fishing line engaging surface forms an angle of about 20° to 50° with the first leg of the handle.

22. A method for embedding a fishing hook substantially within a worm, the hook having a point and a fishing line attached, comprising the following steps:

selecting an impaling member having a length at least equal to a length of the worm, having a transverse dimension sufficiently small to penetrate the worm axially along the length of the worm, and having a first end defining a concavity, and a second end;

selecting an L-shaped handle having a first leg and a second leg joined together at an intersection region, with a fishing line engaging surface at the intersection region;

sizing the first leg of the L-shaped handle so the fishing line between the hook and the fishing line engaging surface forms an angle of about 20° to 50° with the first leg of the handle;

supporting the second end of the impaling member from a distal end of a first leg of the L-shaped handle so that the impaling member and L-shaped handle form a generally Z-shaped structure;

holding the Z-shaped structure by the second leg of the L-shaped handle such that the first end of the impaling member is free;

impaling the worm axially lengthwise on the impaling member by piercing a first end of the worm with the first end of the impaling member, and then sliding the length of the worm onto the impaling member;

placing the point of the hook in said concavity of the first end of the impaling member;

placing the fishing line in a state of tension with the fishing line captured between the fishing line engaging surface and a user's thumb, thereby retaining the point of the hook in place against the first end of the impaling member; and sliding the worm axially off the impaling member and onto the hook, thereby embedding the hook substantially within the body of the worm.

* * * * *